United States Patent
Ejiri et al.

(10) Patent No.: US 8,236,906 B2
(45) Date of Patent: Aug. 7, 2012

(54) POLYAMIDE-IMIDE RESIN, PROCESS FOR PRODUCTION OF POLYAMIDE RESIN, AND CURABLE RESIN COMPOSITION

(75) Inventors: Takako Ejiri, Chikusei (JP); Katsuyuki Masuda, Chikusei (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 307 days.

(21) Appl. No.: 12/293,648

(22) PCT Filed: Mar. 20, 2007

(86) PCT No.: PCT/JP2007/055684
§ 371 (c)(1),
(2), (4) Date: May 21, 2010

(87) PCT Pub. No.: WO2007/108472
PCT Pub. Date: Sep. 27, 2007

(65) Prior Publication Data
US 2010/0234554 A1     Sep. 16, 2010

(30) Foreign Application Priority Data

Mar. 22, 2006 (JP) ............... P2006-078692
Apr. 12, 2006 (JP) ............... P2006-109694
Nov. 27, 2006 (JP) ............... P2006-318852
Nov. 27, 2006 (JP) ............... P2006-318928

(51) Int. Cl.
*C08F 283/04* (2006.01)
(52) U.S. Cl. ......... 525/455; 525/528; 525/451; 525/454
(58) Field of Classification Search ............ 528/75, 528/69; 525/450, 528, 451, 454, 455
See application file for complete search history.

(56) References Cited

U.S. PATENT DOCUMENTS

| | | | |
|---|---|---|---|
| 4,162,274 A * | 7/1979 | Rosenkranz | 528/75 |
| 5,571,884 A | 11/1996 | Guo | |
| 6,238,840 B1 * | 5/2001 | Hirayama et al. | 430/280.1 |
| 2004/0258899 A1 | 12/2004 | Takeuchi et al. | |

FOREIGN PATENT DOCUMENTS

| | | |
|---|---|---|
| JP | 04-132733 | 5/1992 |
| JP | 04-182466 | 6/1992 |
| JP | 06-172516 | 6/1994 |
| JP | 10-182837 | 7/1998 |
| JP | 10-204150 | 8/1998 |
| JP | 10-316754 | 12/1998 |
| JP | 2880523 | 1/1999 |
| JP | 2897186 | 3/1999 |
| JP | 2902761 | 3/1999 |
| JP | 11-217503 | 8/1999 |
| JP | 2000-344889 | 12/2000 |
| JP | 2001-031759 | 2/2001 |
| JP | 2001-031760 | 2/2001 |
| JP | 2003-160730 | 6/2003 |
| JP | 2003-287889 | 10/2003 |
| JP | 2004-143258 | 5/2004 |
| JP | 2005-120135 | 5/2005 |
| JP | 2005120135 A * | 5/2005 |
| JP | 2006-016568 * | 1/2006 |
| WO | WO 2006/008991 | 1/2006 |
| WO | WO 2006/008991 A1 | 1/2006 |

OTHER PUBLICATIONS

Translation of the International Preliminary Report on Patentability mailed Oct. 30, 2008, for Application No. PCT/JP2007/055684.
International Search Report, PCT/JP2007/055684, Apr. 20, 2007.
Korean Official Action issued Sep. 29, 2010, for KR Application No. 10-2008-7023563.

* cited by examiner

*Primary Examiner* — Ling Choi
*Assistant Examiner* — Michael L Leonard
(74) *Attorney, Agent, or Firm* — Antonelli, Terry, Stout & Kraus, LLP.

(57) ABSTRACT

A process for production of a polyamide resin having a reactive double bond, the process including a step of reacting a carboxylic acid and a diisocyanate to produce a polyamide resin, wherein the carboxylic acid component includes a carboxylic acid with a reactive double bond. Also, a polyamide-imide resin obtainable by reacting a diisocyanate with a diimidedicarboxylic acid and a reactive double bond-containing carboxylic acid, which has a reactive double bond.

7 Claims, No Drawings

POLYAMIDE-IMIDE RESIN, PROCESS FOR PRODUCTION OF POLYAMIDE RESIN, AND CURABLE RESIN COMPOSITION

This application is a U.S. National Phase Application under 35 USC 371 of International (PCT) Application No. PCT/JP2007/055684, filed Mar. 20, 2007, which claims priority under 35 USC 119 of Japanese Patent Application No. 2006-318928, filed Nov. 27, 2006, No. 2006-318852, filed Nov. 27, 2006, No. 2006-109694, filed Apr. 12, 2006, and No. 2006-078692, filed Mar. 22, 2006.

TECHNICAL FIELD

The present invention relates to a polyamideimide resin, to a process for production of a polyamide resin, and to a curable resin composition.

BACKGROUND ART

Polyamide resins are generally produced by polymerization reaction between diamines and activated dicarboxylic acids. However, such processes require separation of by-products after polymerization. Processes for production of polyamide resins that require no separation of by-products after polymerization are known, which involve reaction between dicarboxylic acids and diisocyanates (for example, see Patent document 1).

Processes for production of polyamide resins with reactive double bonds are also known, such as (1) introduction of a reactive double bond into polyamic acid (for example, see Patent documents 2 and 3), (2) polymerization of a diamine with maleic anhydride (for example, see Patent document 4), (3) addition of a hydrocarbon oligomer with double bonds to the end of a polyamide (for example, see Patent documents 5 and 6) and (4) introduction of a reactive double bond into polyaniline followed by polymerization with an acid chloride (for example, see Patent document 7).

A curable resin composition can be obtained by using a polyamide resin with a reactive double bond. For example, a photocuring resin composition containing a polyamide resin obtained by the production process of (1) can be cured by heating after patterning by light irradiation (for example, see Patent documents 2 and 3).

The isocyanate method is known as a process for production of polyamideimide resins. As specific examples there may be mentioned a method in which trimellitic anhydride is reacted with a diisocyanate, a method in which an aromatic tricarboxylic anhydride is reacted with an ether bond-containing diamine with an excess of an acid component, and then reacted with a diisocyanate (for example, see Patent document 8), and a method in which the reaction product of a diamine and a diisocyanate is reacted with trimellitic anhydride (for example, see Patent document 9).

These polyamideimide resins themselves do not have curing properties. When these polyamideimide resins are used to prepare curable resin compositions, therefore, it has been necessary to add a curing component. However, a greater amount of added components tends to result in loss of properties of the polyamideimide resins. Methods have therefore been investigated for preparing curable resin compositions using polyamideimide resins with functional groups for curing.

For example, there are known methods of preparing a thermosetting resin composition using a polyamideimide resin having epoxy groups introduced therein (for example, see Patent document 10), methods of preparing a photocuring resin composition using a polyamideimide resin having epoxy groups introduced at the molecular ends as a photosensitive resist (for example, see Patent document 11), and methods of preparing a curable resin composition using a polyamideimide resin having a reactive double bond introduced therein (for example, see Patent documents 12 and 13). As examples of methods of introducing a reactive double bond into a polyamideimide resin there are known methods wherein the polyamideimide site is copolymerized with the reactive double bond site (for example, see Patent document 12) and methods wherein the molecular ends are sealed with reactive double bonds (for example, see Patent document 13). There is also known a method wherein a photocuring resin composition containing a polyamide-amide acid with a reactive double bond is irradiated, patterned and then heated to form a polyamideimide resin (for example, see Patent document 14).

[Patent document 1] Japanese Unexamined Patent Publication HEI No. 06-172516
[Patent document 2] Japanese Patent Publication No. 2880523
[Patent document 3] Japanese Unexamined Patent Publication No. 2003-287889
[Patent document 4] Japanese Unexamined Patent Publication HEI No. 10-182837
[Patent document 5] Japanese Unexamined Patent Publication No. 2001-31759
[Patent document 6] Japanese Unexamined Patent Publication No. 2001-31760
[Patent document 7] Japanese Unexamined Patent Publication HEI No. 04-132733
[Patent document 8] Japanese Patent Publication No. 2897186
[Patent document 9] Japanese Unexamined Patent Publication HEI No. 04-182466
[Patent document 10] Japanese Unexamined Patent Publication HEI No. 11-217503
[Patent document 11] Japanese Unexamined Patent Publication HEI No. 10-204150
[Patent document 12] Japanese Unexamined Patent Publication No. 2000-344889
[Patent document 13] Japanese Unexamined Patent Publication HEI No. 10-316754
[Patent document 14] Japanese Patent Publication No. 2902761

DISCLOSURE OF THE INVENTION

Problems to be Solved by the Invention

Further improvement has been desired for conventional curable resin compositions containing polyamide resins with reactive double bonds, from the viewpoint of film formability and post-curing heat resistance. According to the method described in Patent document 4, for example, polymerization is inhibited by imide ring formation, while according to the method described in Patent document 7, the numerous branches tend to result in gelling. It has therefore been difficult to achieve a high molecular weight for the polyamide resin by any of these methods, and the film formability and heat resistance after curing have not always been sufficient.

In addition, conventional curable resin compositions containing polyamide resins with reactive double bonds often cannot be efficiently cured at low temperature. The curable resin compositions described in Patent documents 5 and 6, for example, have double bonds introduced at their ends which have prevented efficient curing from taking place.

Furthermore, it has been desired to achieve greater improvement in conventional curable resin compositions containing polyamideimide resins from the viewpoint of film formability, curability and heat resistance after curing.

The thermosetting resin composition described in Patent document 10 has tended to fail to undergo efficient low temperature curing. Moreover, the unreacted epoxy groups that remain in some cases can lead to insufficient heat resistance after curing.

It is therefore an object of the present invention to provide a polyamide resin or polyamideimide resin that allows curable resin compositions to be obtained that exhibit excellent film formability, that efficiently cure even at low temperature and that have sufficiently high heat resistance after curing, as well as a process for production of the same. It is another object of the invention to provide a curable resin composition that exhibits excellent film formability, that efficiently cures even at low temperature and that has sufficiently high heat resistance after curing.

Means for Solving the Problems

The invention provides a process for production of a polyamide resin having a reactive double bond, the process comprising a step of reacting a carboxylic acid component and a diisocyanate to produce a polyamide resin, wherein the carboxylic acid component includes a carboxylic acid with a reactive double bond.

Implementing this production process will inhibit gelling and result in a high molecular weight polyamide resin. It will thus be possible to produce a polyamide resin which allows a curable resin composition to be obtained that exhibits excellent film formability, that efficiently cures even at low temperature and that has sufficiently high heat resistance after curing.

The carboxylic acid with a reactive double bond is preferably a carboxylic acid obtainable by reacting a dicarboxylic anhydride with a (meth)acrylate compound having a functional group that reacts with a dicarboxylic anhydride group to produce carboxyl groups, and having an acrylate or methacrylate group.

By using a carboxylic acid that can be easily produced in this manner, it is possible to easily obtain a carboxylic acid as a material for production of a polyamide resin according to the invention. This will facilitate production of the polyamide resin of the invention.

The average number of functional groups in each molecule of the (meth)acrylate compound is preferably no greater than 2.5.

This will inhibit gelling due to branching, thus further facilitating increase in the molecular weight of the polyamide resin. It will therefore be possible to produce a polyamide resin which allows a curable resin composition to be obtained that exhibits more excellent film formability and that has even higher heat resistance after curing.

The functional groups are preferably hydroxyl groups.

The invention further provides a curable resin composition comprising a polyamide resin obtainable by the production process of the invention. By including such a polyamide resin, it is possible to obtain a curable resin composition that exhibits excellent film formability, that efficiently cures even at low temperature and that has sufficiently high heat resistance after curing.

The invention still further provides a polyamideimide resin obtainable by reacting a diisocyanate with a diimidedicarboxylic acid and a reactive double bond-containing carboxylic acid, which has a reactive double bond.

The polyamideimide resin of the invention has the reactive double bond on side chains. A polyamideimide resin according to the invention can therefore be used to obtain a curable resin composition that efficiently cures even at low temperature. By having the reactive double bond on side chains, the polyamideimide resin of the invention is also resistant to gelling and has a higher molecular weight. A polyamideimide resin according to the invention can therefore be used to obtain a curable resin composition that has excellent film formability and sufficiently high heat resistance after curing.

The reactive double bond-containing carboxylic acid is preferably a carboxylic acid obtainable by reacting a carboxylic anhydride with a compound having a functional group that reacts with a carboxylic anhydride group to produce a carboxyl group, and having a reactive double bond. By using a reactive double bond-containing carboxylic acid that can be readily produced in this manner, it is possible to easily obtain a reactive double bond-containing carboxylic acid as a material for production of a polyamideimide resin according to the invention. This will facilitate production of the polyamideimide resin of the invention.

The average number of functional groups in each molecule of the compound having a functional group that reacts with a carboxylic anhydride group to produce a carboxyl group and having a reactive double bond, is preferably between 1.5 and 2.5. This will inhibit gelling due to branching, thus facilitating further increase in the molecular weight of the resin. This type of polyamideimide resin may be used to obtain a curable resin composition that has more excellent film formability and higher heat resistance after curing. The functional groups are preferably hydroxyl groups. This will inhibit secondary reactions and thus further facilitate production of a reactive double bond-containing carboxylic acid.

The diimidedicarboxylic acid is preferably a diimidedicarboxylic acid obtainable by reaction between a diamine and a tricarboxylic monoanhydride. By using a diimidedicarboxylic acid that can be easily produced in this manner, it is possible to easily obtain a diimidedicarboxylic acid as a material for production of a polyamideimide resin according to the invention. This will facilitate production of the polyamideimide resin of the invention.

The invention further provides a curable resin composition comprising a polyamideimide resin according to the invention. By including such a polyamideimide resin, it is possible to obtain a curable resin composition that exhibits excellent film formability, that efficiently cures even at low temperature and that has sufficiently high heat resistance after curing.

Effect of the Invention

According to the invention it is possible to provide a polyamide resin or polyamideimide resin that allows curable resin compositions to be obtained that exhibit excellent film formability, that efficiently cure even at low temperature and that have sufficiently high heat resistance after curing, as well as a process for production of the same. It is also possible to provide a curable resin composition that exhibits excellent film formability, that efficiently cures even at low temperature and that has sufficiently high heat resistance after curing.

BEST MODES FOR CARRYING OUT THE INVENTION

Embodiments of the invention will now be described. However, the present invention is not limited to the embodiments described below.

The invention provides a process for production of a polyamide resin with a reactive double bond. The production process of this embodiment comprises a step of reacting a carboxylic acid component with a diisocyanate to produce a polyamide resin. Polymerization reaction between the carboxylic acid component and diisocyanate yields a polyamide resin composed of a polymer with an amide group on the main chain. In order to introduce a reactive double bond into the polyamide resin that is produced, the carboxylic acid component includes one or more kinds of carboxylic acids with reactive double bonds.

The polymerization reaction between the carboxylic acid component and diisocyanate may be carried out by appropriate optimization of the reaction temperature and other conditions. Specifically, from the viewpoint of the reaction rate, the reaction is preferably carried out at 100° C. or higher and more preferably at 140° C. to 180° C. The polymerization reaction temperature can be lowered by using a tertiary amine such as an imidazole or trialkylamine as the catalyst for polymerization.

As diisocyanates there may be used, for example, one or more compounds selected from the group consisting of methylene diisocyanate, tolylene diisocyanate, isophorone diisocyanate and cyclohexyl diisocyanate.

When the carboxylic acid is a dicarboxylic acid, the diisocyanate is preferably used at about 0.7 to 1.3 equivalents and more preferably 1.00 to 1.20 equivalents with respect to the total amount of dicarboxylic acid. An amount of less than 1 equivalent will leave unreacted carboxylic acid while an amount of greater than 1.3 equivalents will result in secondary reactions by unreacted diisocyanate, thus lowering the molecular weight of the polyamide resin that is produced and tending to reduce the improving effect on the heat resistance and film formability.

The carboxylic acid with a reactive double bond is not particularly restricted so long as it has a carboxyl group and one or more reactive double bonds. A reactive double bond is a double bond that can undergo radical polymerization reaction. As functional groups with reactive double bonds there are particularly preferred acrylate and methacrylate groups, because of their high reactivity.

In order to inhibit gelling, the average number of carboxyl groups in the carboxylic acid with a reactive double bond is preferably no greater than 2.5. The carboxylic acid with a reactive double bond preferably includes a dicarboxylic acid. That is, the carboxylic acid with a reactive double bond preferably includes a carboxylic acid with an acrylate or methacrylate group, and more preferably a dicarboxylic acid with an acrylate or methacrylate group.

Carboxylic acids with acrylate or methacrylate groups are represented by the following general formula (1), for example. In general formula (1), $R^1$ and $R^2$ each independently represent divalent organic groups. $R^1$ is a group derived from an epoxy compound such as a bisphenol A-type epoxy compound, for example. $R^2$ is a group derived from a dicarboxylic anhydride such as cis-4-cyclohexene-1,2-dicarboxylic anhydride or maleic anhydride, for example. $R^3$ represents a hydrogen atom or a methyl group.

[Chemical Formula 1]

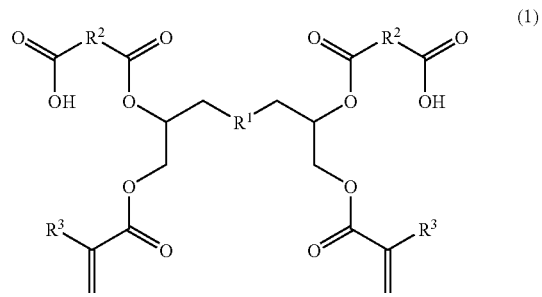

A carboxylic acid represented by general formula (1) above may be obtained by reacting a carboxylic anhydride with a (meth)acrylate compound having a hydroxyl group as a functional group that reacts with carboxylic anhydride groups to produce carboxyl groups, and having an acrylate or methacrylate group.

Epoxy acrylate is an example of a (meth)acrylate compound with a hydroxyl group as the functional group. Epoxy acrylate is represented by the following general formula (2), for example. Functional groups other than hydroxyl may include thiol and the like.

The carboxylic anhydride is preferably a dicarboxylic anhydride represented by the following general formula (3).

Specifically, an epoxy acrylate of formula (2) and a dicarboxylic anhydride of formula (3) may be reacted, as represented by the reaction scheme shown below, to easily produce a dicarboxylic acid with acrylate or methacrylate groups, represented by formula (1). $R^1$, $R^2$ and $R^3$ in formulas (2) and (3) are the same as $R^1$, $R^2$ and $R^3$ in formula (1).

[Chemical Formula 2]

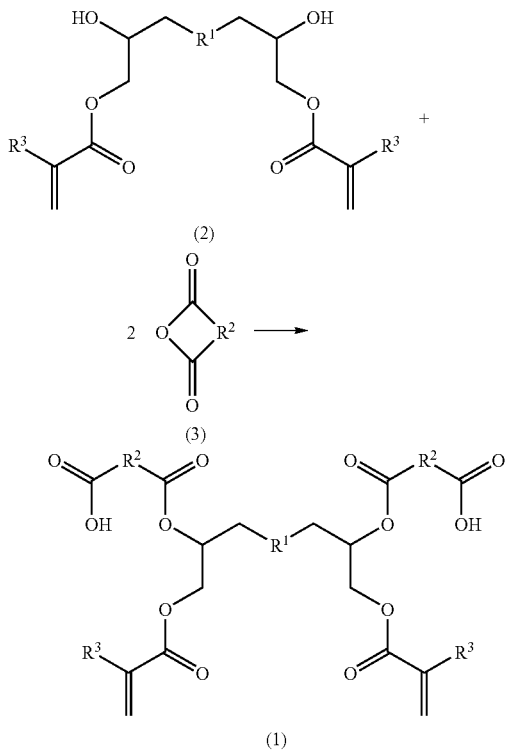

As shown by the above reaction scheme, reaction between the epoxy acrylate and carboxylic anhydride is a reaction between the hydroxyl groups of the epoxy acrylate and the carboxylic anhydride groups. Polymerization reaction between diols and diisocyanates generally produces polyurethanes, but a polymerization reaction between an epoxy acrylate and diisocyanate tends to cause gelling. However, gelling does not easily occur with reaction between the hydroxyl groups of an epoxy acrylate and carboxylic anhydride groups.

The number of hydroxyl groups in each molecule of the epoxy acrylate that is reacted with the carboxylic anhydride is preferably an average of between 1.5 and 2.5, and more preferably between 2 and 2.5. If the number of hydroxyl groups is less than this range the reaction will not readily proceed, and if it is greater there will be more branching and gelling will tend to likely occur.

The reaction between the epoxy acrylate and dicarboxylic anhydride may be conducted at below room temperature (25° C.), but it is preferably carried out at 30° C. to 150° C. and more preferably 80° C. to 120° C. from the viewpoint of the reaction rate. Although 100% reaction with the equivalent of hydroxyl groups is possible in theory, the dicarboxylic anhydride equivalents are preferably 0.80 to 1.10 and more preferably 0.90 to 1.05 with respect to the equivalents of hydroxyl groups, from the viewpoint of the reaction rate. Less than 0.8 equivalent will leave unreacted hydroxyl groups and cause gelling, while greater than 1.10 equivalents will result in secondary reactions by the unreacted dicarboxylic anhydride, tending to lower the molecular weight of the resin produced and reduce the effect of improvement in the heat resistance or film formability.

There are no particular restrictions on the dicarboxylic anhydride, and for example, any one or more selected from the group consisting of methyltetrahydrophthalic anhydride, methylhexahydrophthalic anhydride, methylhymic anhydride, hexahydrophthalic anhydride, trialkyltetrahydrophthalic anhydrides, phthalic anhydride, tetrahydrophthalic anhydride and maleic anhydride may be used.

The epoxy acrylate may be a commercially available epoxy acrylate, such as EA-1020 (trade name of Shin-Nakamura Chemical Co., Ltd., hydroxyl equivalents: 270) or EMA-1020 (trade name of Shin-Nakamura Chemical Co., Ltd., hydroxyl equivalents: 280). The number of hydroxyl groups in each molecule of the epoxy acrylate is preferably an average of between 2 and 2.5.

The epoxy acrylate of formula (2) may also be produced by reaction between a bisepoxy compound of formula (4) and an acrylic acid or methacrylic acid of formula (5), as represented by the following reaction scheme. $R^1$ and $R^3$ in the formulas are the same as defined above.

[Chemical Formula 3]

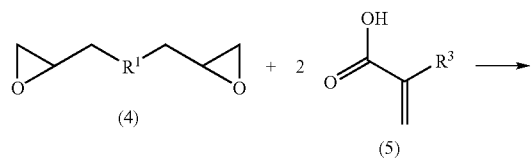

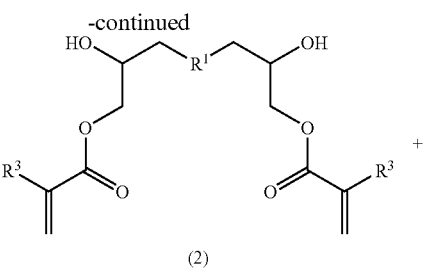

There are no particular restrictions on the bisepoxy compound of formula (4), but preferably the number of epoxy groups in each molecule is an average of between 2 and 2.5, in order to prevent branching in the resulting resin. Examples of such epoxy compounds include bisphenol A-type epoxy compounds (for example, EPIKOTE 825 by Japan Epoxy Resins Co., Ltd.), bisphenol F-type epoxy compounds (for example, EPIKOTE 806 by Japan Epoxy Resins Co., Ltd.) and biphenyl-type epoxy compounds (for example, EPIKOTE YX 4000H by Japan Epoxy Resins Co., Ltd.).

A portion of the carboxylic acid component that is reacted with the diisocyanate may be a dicarboxylic acid without reactive double bonds. This will facilitate alteration of the resin backbone, thus allowing adjustment of the physical properties such as heat resistance and film formability.

There are no particular restrictions on dicarboxylic acids without reactive double bonds, and for example, one or more selected from the group consisting of isophthalic acid, terephthalic acid, adipic acid, sebacic acid, and imidedicarboxylic acids derived from reaction between a diamine and two equivalents of trimellitic acid (diimidedicarboxylic acid) may be used. A polyamideimide resin, which is a polyamide resin with an imide group, can be obtained by reacting a diisocyanate with a carboxylic acid containing a reactive double bond (a reactive double bond-containing carboxylic acid) and a diimidedicarboxylic acid. The polyamideimide resin will be explained in detail later.

There are no particular restrictions on the diamine, and aromatic diamines, aliphatic diamines or siloxanediamines may be used. Examples of aromatic diamines include 2,2-bis[4-(4-aminophenoxy)phenyl]propane, bis[4-(3-aminophenoxy)phenyl]sulfone, bis[4-(4-aminophenoxy)phenyl]sulfone, 2,2-bis[4-(4-aminophenoxy)phenyl]hexafluoropropane, bis[4-(4-aminophenoxy)phenyl]methane, 4,4'-bis(4-aminophenoxy)biphenyl, bis[4-(4-aminophenoxy)phenyl]ether, bis[4-(4-aminophenoxy)phenyl]ketone, 1,3-bis(4-aminophenoxy)benzene, 1,4-bis(4-aminophenoxy)benzene, 2,2'-dimethylbiphenyl-4,4'-diamine, 2,2'-bis(trifluoromethyl)biphenyl-4,4'-diamine, 2,6,2',6'-tetramethyl-4,4-diamine, 5,5'-dimethyl-2,2'-sulfonylbiphenyl-4,4'-diamine, (4,4'-diamino)diphenyl ether, (4,4'-diamino)diphenylsulfone, (4,4'-diamino)benzophenone, (3,3'-diamino)benzophenone, (4,4'-diamino)diphenylmethane, (4,4'-diamino)diphenyl ether and (3,3'-diamino)diphenyl ether. Examples of aliphatic diamines include (4,4'-diamino)dicyclohexylmethane and polypropylene oxide diamine (trade name: JEFFAMINE). Examples of siloxanediamines include polydimethylsiloxanediamine (the silicone oils X-22-161AS (amine equivalents: 450), X-22-161A (amine equivalents: 840), X-22-161B (amine equivalents: 1500), X-22-9409 (amine equivalents: 700), X-22-1660B-3 (amine equivalents: 2200) and KF-8010 (amine equivalents: 415)) (all products of Shin-Etsu Chemical Co., Ltd.).

The diamine may be reacted with the carboxylic acid together with the diisocyanate to produce a polyamide resin.

A curable resin composition containing a polyamide resin with a reactive double bond is cured by heat or light. The curable resin composition may also contain a curing accelerator, crosslinking agent, particles, flame retardant and sensitizing agent as necessary, in addition to the polyamide resin.

The polyamideimide resin of this embodiment is a polyamideimide resin obtained by reacting a diisocyanate with a diimidedicarboxylic acid and a reactive double bond-containing carboxylic acid, which has a reactive double bond. For example, a polyamideimide resin may be obtained by a process in which a diimidedicarboxylic acid represented by the following general formula (6) and a reactive double bond-containing carboxylic acid represented by the following general formula (1) are reacted with a diisocyanate represented by the following general formula (7), to produce a polyamideimide resin containing the structures represented by the following general formula (A) and (B), respectively.

[Chemical Formula 4]

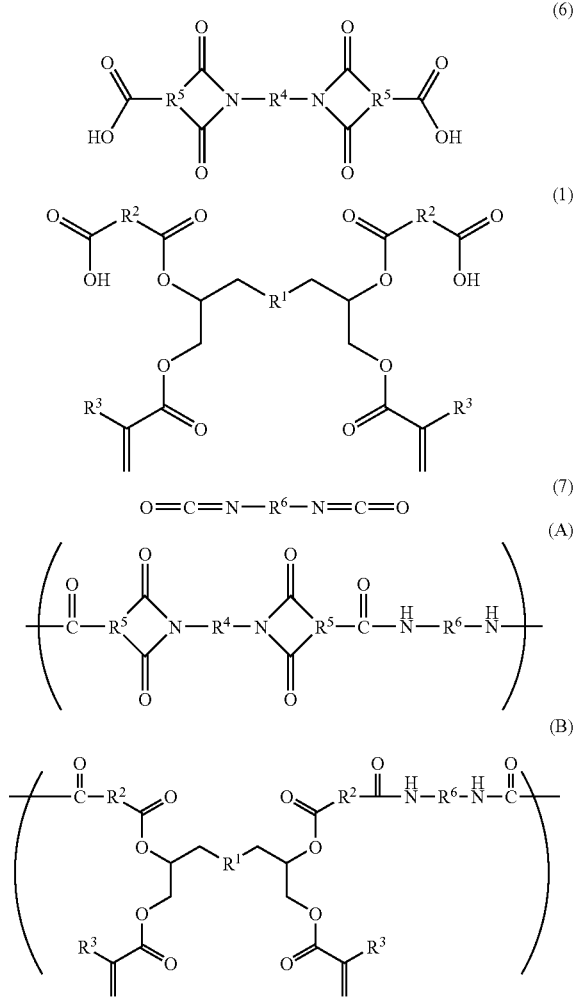

In formula (6), $R^4$ is a divalent organic group, and is derived from a diamine compound such as 2,2-bis[4-(4-aminophenoxy)phenyl]propane. $R^5$ is a trivalent organic group, and is derived from a tricarboxylic monoanhydride such as trimellitic anhydride. $R^1$, $R^2$ and $R^3$ in formula (1) are the same as defined above. In formula (7), $R^6$ is a divalent organic group, and is derived from a diisocyanate such as 4,4'-diphenylmethane diisocyanate. $R^1$-$R^6$ in formula (A) and formula (B) are the same as $R^1$-$R^6$ in formulas (1)-(3).

The curability of the polyamideimide resin of this embodiment can be efficiently controlled by optional introduction of reactive double bonds into side chains. For example, by simultaneously reacting the diimidedicarboxylic acid and the reactive double bond-containing carboxylic acid with the diisocyanate, it is possible to obtain a polyamideimide resin having reactive double bonds evenly distributed throughout the molecule. On the other hand, by either reacting the diimidedicarboxylic acid and diisocyanate first and then adding the reactive double bond-containing carboxylic acid for reaction, or reacting the reactive double bond-containing carboxylic acid and diisocyanate first and then adding the diimidedicarboxylic acid for reaction, it is possible to obtain a polyamideimide resin wherein the structure of formula (B) with reactive double bonds is locally concentrated.

In the reaction between the diimidedicarboxylic acid and reactive double bond-containing carboxylic acid and the diisocyanate, the molar ratio between the diimidedicarboxylic acid and the reactive double bond-containing carboxylic acid is preferably 99:1 to 1:99 and more preferably 95:5 to 50:50. If the molar ratio of the reactive double bond-containing carboxylic acid is less than this range the effect of the reactive double bonds will tend to be less prominent, and if it is greater the Tg (glass transition temperature) and strength of the polyamideimide resin will tend to be reduced.

The reactive double bond-containing carboxylic acid is not particularly restricted so long as it has a reactive double bond. A reactive double bond is a double bond that can undergo radical polymerization reaction. As functional groups with reactive double bonds there are particularly preferred acrylate and methacrylate groups, because of their high reactivity. In order to inhibit gelling during production of the polyamideimide resin, the average number of carboxyl groups in each molecule of the reactive double bond-containing carboxylic acid is preferably between 1.5 and 2.5. The reactive double bond-containing carboxylic acid preferably includes a dicarboxylic acid. That is, the reactive double bond-containing carboxylic acid preferably includes a carboxylic acid with an acrylate or methacrylate group, and more preferably a dicarboxylic acid with an acrylate or methacrylate group. Dicarboxylic acids with acrylate or methacrylate groups are represented by general formula (1) above, for example.

The reactive double bond-containing carboxylic acid is obtained by reacting a carboxylic anhydride with a (meth)acrylate compound having a hydroxyl group as a functional group that reacts with a carboxylic anhydride group to produce a carboxyl group, and having an acrylate or methacrylate group. Amino groups may be mentioned as examples of functional groups other than hydroxyl groups, but hydroxyl groups are preferred from the viewpoint of preventing secondary reactions. The aforementioned epoxy acrylates are examples of (meth)acrylate compounds with hydroxyl groups as the functional groups.

The diimidedicarboxylic acid of formula (6) above is preferably a diimidedicarboxylic acid obtained by reaction between a diamine and a tricarboxylic monoanhydride. There are no particular restrictions on the diamine, and aromatic diamines, aliphatic diamines or siloxanediamines may be used. As examples of aromatic diamines there may be mentioned 2,2-bis[4-(4-aminophenoxy)phenyl]propane, bis[4-(3-aminophenoxy)phenyl]sulfone, bis[4-(4-aminophenoxy)phenyl]sulfone, 2,2-bis[4-(4-aminophenoxy)phenyl]hexafluoropropane, bis[4-(4-aminophenoxy)phenyl]methane, 4,4'-bis(4-aminophenoxy)biphenyl, bis[4-(4-aminophenoxy)phenyl]ether, bis[4-(4-aminophenoxy)

phenyl]ketone, 1,3-bis(4-aminophenoxy)benzene, 1,4-bis(4-aminophenoxy)benzene, 2,2'-dimethylbiphenyl-4,4'-diamine, 2,2'-bis(trifluoromethyl)biphenyl-4,4'-diamine, 2,6,2',6'-tetramethyl-4,4'-diamine, 5,5'-dimethyl-2,2'-sulfonyl-biphenyl-4,4'-diamine, (4,4'-diamino)diphenyl ether, (4,4'-diamino)diphenylsulfone, (4,4'-diamino)benzophenone, (3,3'-diamino)benzophenone, (4,4'-diamino)diphenylmethane, (4,4'-diamino)diphenyl ether and (3,3'-diamino) diphenyl ether. As examples of aliphatic diamines there may be mentioned (4,4'-diamino)dicyclohexylmethane and polypropylene oxide diamine (trade name: JEFFAMINE). As examples of siloxanediamines there may be mentioned polydimethylsiloxanediamine (the silicone oils X-22-161AS (amine equivalents: 450), X-22-161A (amine equivalents: 840), X-22-161B (amine equivalents: 1500), X-22-9409 (amine equivalents: 700), X-22-1660B-3 (amine equivalents: 2200) and KF-8010 (amine equivalents: 415)) (all products of Shin-Etsu Chemical Co., Ltd.). At least one selected from the group consisting of these compounds may be used as a diamine for synthesis of a diimidedicarboxylic acid. As examples of tricarboxylic monoanhydrides there may be mentioned anhydrides of trimellitic acid and hydrogenated trimellitic acid. The equivalents of the tricarboxylic monoanhydride are preferably 1.0 to 1.3 and more preferably 1.05 to 1.2 with respect to the equivalents of the diamine. Unreacted diamine will remain at below this range, and gelling will tend to occur at above this range.

A dicarboxylic acid may be added during reaction of the diimidedicarboxylic acid and the reactive double bond-containing carboxylic acid with the diisocyanate. As examples of such dicarboxylic acids there may be mentioned terephthalic acid, hydroxyisophthalic acid and α,ω-polybutadienedicarboxylic acid.

The molecular weight of the polyamideimide resin is preferably 8000-200000, because at less than 8000 the film will be brittle, and at greater than 200000 the viscosity will be increased, tending to reduce the manageability.

A curable resin composition containing a polyamideimide resin with a reactive double bond is cured by heat or light. There are no particular restrictions on the proportion of the polyamideimide resin in the curable resin composition, and it may be 100 wt % of the total curable resin composition but is preferably 52 to 99 wt % of the total. If necessary, the curable resin composition may also contain a curing accelerator, crosslinking agent, particles, flame retardant and sensitizing agent.

Crosslinking can be efficiently promoted by including a curing accelerator. There are no particular restrictions on curing accelerators so long as they accelerate reaction between reactive double bonds, but depending on the curing temperature and wavelength used, it may be necessary to select a peroxide-based, radical or cationic compound, or a combination thereof. Representative compounds that may be used include one or more selected from the group consisting of peroxyketal compounds such as 1,1-di(t-butylperoxy)cyclohexane and 1,1-di(t-hexylperoxy)cyclohexane, dialkyl peroxide-based compounds such as α,α'-di(t-butylperoxy) diisopropylbenzene, 2,5-dimethyl-2,5-bis(t-butylperoxy)-3-hexyne, 2,5-dimethyl-2,5-bis(t-butylperoxy)-3-hexane, di-t-hexyl peroxide, di-t-butyl peroxide, t-butylcumyl peroxide and dicumyl peroxide, ketone peroxide compounds such as methyl ethyl ketone peroxide and peroxy ester compounds such as peroxy t-butylbenzoate and 2,5-dimethyl-2,5-di(benzoylperoxy)hexane, as peroxide-based compounds; benzophenone compounds such as benzophenone, 2-methyl-[4-(methylthio)phenyl]-2-morpholinopropan-1-one and 4,4'-bis (dimethylamino)benzophenone, thioxanthone compounds such as 2-isopropylthioxanthone, metal complexes such as titanocene, phosphinic acid compounds such as 2,4,6-trimethylbenzoyldiphenylphosphine oxide, benzoin compounds such as 2-hydroxy-1,2-diphenylethanone, 2-isopropyl-1,2-diphenylethanone, 2,2-dimethoxy-1,2-diphenylethanone and 1-hydroxycyclohexylphenylketone, amine compounds such as methyldiethanolamine and ester compounds such as 4-(dimethylamino)ethyl benzoate, as radical-based compounds; and onium salts such as bis[4-(diphenylsulfonio) phenyl]sulfide bishexafluorophosphate and diphenyliodonium hexafluorophosphate and metal complexes such as (cyclopentadienyl)(isopropylbenzene)iron(II), as cationic-based compounds. The content of the curing accelerator is not particularly restricted, but it is preferably 0.01 to 20 parts by weight and more preferably 0.1 to 10 parts by weight with respect to 100 parts by weight of the resin, in order to maintain the properties of the resin.

The crosslinking agent is a compound having a functional group that can react with reactive double bonds, and capable of crosslinking polyamide resins. Including a crosslinking agent can efficiently promote curing, and can improve the physical properties including coefficient of thermal expansion, adhesion and chemical resistance. Examples of such compounds include bismaleimide compounds, bisnadic acid compounds and di(meth)acrylates. The content of the crosslinking agent is preferably 1 to 90 parts by weight and more preferably 5 to 70 parts by weight with respect to 100 parts by weight of the resin. At less than 1 part by weight the effect of the crosslinking agent will not be exhibited, and at greater than 90 parts by weight the properties of the crosslinking agent will be dominant, thus tending to interfere with the properties of the resin.

Including particles can improve the expansion coefficient and electrical characteristics. Examples of particles include silica, alumina, titania and zirconia particles. The maximum particle size of the particles is preferably no greater than 500 nm. If the particle size of the particles is greater than 500 nm, defects will tend to occur with greater frequency when the curable resin composition is used to form a cured film. The content of particles is preferably 1 to 90 parts by weight to 100 parts by weight of the resin. At less than 1 part by weight the effect of the particles will be reduced, and at greater than 90 parts by weight the reliability will tend to be lower due to defects.

Flame retardance can be imparted by including a flame retardant. Commonly employed additive flame retardants may be used without any particular restrictions. The content of the flame retardant is preferably 0.1 to 50 parts by weight to 100 parts by weight of the resin. At less than 0.1 part by weight the effect of the flame retardant will be reduced, and at greater than 50 parts by weight the effect of improving the physical properties of the resin will tend to be minimal.

Addition of a sensitizing agent is effective for achieving efficient absorption of light. The sensitizing agent is selected according to the wavelength of the light source used for irradiation. There are no particular restrictions on the content of the sensitizing agent, but it is preferably 0.01 to 20 wt % and more preferably 0.1 to 10 wt % with respect to the solid portion of the resin, in order to maintain the properties of the resin and accomplish efficient image formation.

The curable resin composition of the invention may also contain a rubber-based elastomer, pigment, leveling agent, antifoaming agent, ion trapping agent or the like as necessary.

The curable resin composition of the invention can be used to form an adhesive layer. Methods for forming adhesive layers include methods of directly coating a base material with the curable resin composition and methods of using a resin film composed of the curable resin composition.

For direct coating, the curable resin composition dissolved or dispersed in a diluent may be coated onto the base using a spin coater, multicoater or the like, and then heated or blasted with hot air to dry the diluent and form an adhesive layer.

The diluent is not particularly restricted so long as it dissolves or disperses the composition. For example, one or more compounds selected from the group consisting of acetone, methyl ethyl ketone, toluene, xylene, methyl isobutyl ketone, ethyl acetate, ethyleneglycol monomethyl ether, methanol, ethanol, N,N-dimethylformamide, N,N-dimethylacetamide, γ-butyrolactone and N-methyl-2-pyrrolidone may be used.

For a method using a resin film, the resin film that has been formed on a support is bonded onto the base. The resin film can be obtained by coating a support with the curable resin composition dissolved or dispersed in a diluent, and then heating or blasting with hot air to dry the diluent. The diluent used may be any of those mentioned above. An adhesive film comprising a support and a resin film formed on the support is laminated on the base, and then heated and/or dried if necessary to form an adhesive layer on the base. The support may be released from the resin film either before lamination or after lamination.

Examples of materials for the support include polyethylene, polyvinyl chloride, polyethylene terephthalate, polycarbonate and tetrafluoroethylene films, release paper, and metal foils such as copper foil or aluminum foil, and the thickness of the support is preferably 10 to 150 µm. The support may also be subjected to mat treatment, corona treatment or release treatment. The method for storing the adhesive film may be a method in which the adhesive film is cut to a fixed length and stored as a sheet, or a method in which it is wound up into a roll for storage. From the viewpoint of storage life, productivity and manageability, a protective film is preferably laminated over the resin film of the adhesive film before winding up into a roll for storage. Examples of protective films include polyethylene, polyvinyl chloride and polyethylene terephthalate films and release paper, which may optionally be subjected to mat treatment, embossing treatment or release treatment.

The base may be copper, aluminum, polyimide, ceramic or glass, although there is no restriction to these.

The adhesive layer formed on the base may be cured by total or partial polymerization using light irradiation or heating.

In the case of heating, a hot plate or oven may be used to carry out the curing. The curing temperature will differ depending on the presence of a curing accelerator and its type, but is preferably 130 to 230° C. during operation.

In the case of light irradiation, the light source used may be any desired light source, and as examples there may be mentioned lamp light sources such as a xenon lamp, halogen lamp, tungsten lamp, high-pressure mercury lamp, ultra-high-pressure mercury lamp, medium-pressure mercury lamp, low-pressure mercury lamp, carbon arc, black light lamp, metal halide lamp or the like, and laser light sources such as an argon ion laser, excimer laser, nitrogen laser, YAG laser or the like. An optical filter may be utilized if necessary if a specific wavelength is desired. Subsequent heating with a hot plate or oven can complete the curing.

EXAMPLES

The present invention will now be explained in greater detail by examples. However, the invention is not limited to these examples.

Synthesis of Resins

Example 1

A 300 mL separable flask equipped with a Dean-Stark reflux condenser, thermometer and stirrer was prepared. There were added thereto 37 mmol of the epoxy acrylate EA-1020 (trade name of Shin-Nakamura Chemical Co., Ltd., hydroxyl equivalents: 270), 78 mmol of cis-4-cyclohexene-1,2-dicarboxylic anhydride and 85 g of the aprotic polar solvent N-methyl-2-pyrrolidone, to prepare a reaction mixture. The reaction mixture was heated to 100° C. and stirred for 2 hours.

The reaction mixture was then cooled to room temperature (25° C.). After next adding 26 mmol of 4,4'-diphenylmethane diisocyanate, the reaction mixture was heated to 150° C. and reaction was conducted for 2 hours at that temperature. The reaction produced a polyamide resin, obtained as a solution of the polyamide resin in NMP.

Example 2

A 1000 mL separable flask equipped with a Dean-Stark reflux condenser, thermometer and stirrer was prepared. There were added thereto 80 mmol of the diamine compound 2,2-bis[4-(4-aminophenoxy)phenyl]propane, 4 mmol of the siloxanediamine KF-8010 (trade name of Shin-Etsu Chemical Co., Ltd., amine equivalents: 415), 176 mmol of trimellitic anhydride and 349 g of the aprotic polar solvent N-methyl-2-pyrrolidone. The reaction mixture was heated to 80° C. and stirred for 30 minutes.

Upon completion of stirring, 200 mL of toluene was further added as an aromatic hydrocarbon capable of forming an azeotropic mixture with water, and then the reaction mixture was heated to 160° C. for 4 hours of reflux. Upon confirming accumulation of a stoichiometric amount of water in the water measuring receptacle with no further outflow of run-off of water, the water and toluene in the water measuring receptacle were removed. The temperature was then raised to 180° C. to remove the toluene from the reaction mixture.

The solution in the flask was cooled to room temperature (25° C.). There were added thereto 84 mmol of the epoxy acrylate EA-1020 (trade name of Shin-Nakamura Chemical Co., Ltd., hydroxyl equivalents: 270) and 176 mmol of cis-4-cyclohexene-1,2-dicarboxylic anhydride, and the reaction mixture was heated to 100° C. for 2 hours of reaction at that temperature. After again cooling the solution in the flask to room temperature (25° C.), 117 mmol of 4,4'-diphenylmethane diisocyanate was added and the reaction mixture was heated to 150° C. for 2 hours of reaction at that temperature. The reaction produced a polyamide resin with imide groups (polyamideimide resin), obtained as a solution of the polyamide resin with imide groups in NMP.

Example 3

A 500 mL separable flask equipped with a Dean-Stark reflux condenser, thermometer and stirrer was prepared. There were added thereto 43 mmol of the diamine compound 2,2-bis[4-(4-aminophenoxy)phenyl]propane, 2 mmol of the siloxanediamine KF-8010 (trade name of Shin-Etsu Chemical Co., Ltd., amine equivalents: 415), 95 mmol of trimellitic anhydride and 191 g of the aprotic polar solvent N-methyl-2-pyrrolidone, and the reaction mixture was heated to 80° C. and stirred for 30 minutes.

Upon completion of stirring, 100 mL of toluene was further added as an aromatic hydrocarbon capable of forming an azeotropic mixture with water, and then the reaction mixture was heated to 160° C. for 4 hours of reflux. Upon confirming accumulation of a stoichiometric amount of water in the water measuring receptacle with no further outflow of run-off of water, the water and toluene in the water measuring receptacle were removed. The reaction mixture was then heated to 180° C. to remove the toluene.

The solution in the flask was cooled to room temperature (25° C.). There were added thereto 45 mmol of the epoxy acrylate EA-1020 (trade name of Shin-Nakamura Chemical Co., Ltd., hydroxyl equivalents: 270) and 95 mmol of cis-4-cyclohexene-1,2-dicarboxylic anhydride, and the reaction mixture was heated to 100° C. for 2 hours of reaction at that temperature. After again cooling the solution in the flask to room temperature (25° C.), 72 mmol of 4,4'-diphenylmethane diisocyanate was added and the reaction mixture was heated to 150° C. for 2 hours of reaction at that temperature. The reaction produced a polyamide resin with imide groups, obtained as a solution of the polyamide resin with imide groups in NMP.

Example 4

A 500 mL separable flask equipped with a Dean-Stark reflux condenser, thermometer and stirrer was prepared. There were added thereto 29 mmol of the diamine compound 2,2-bis[4-(4-aminophenoxy)phenyl]propane, 2 mmol of the siloxanediamine KF-8010 (trade name of Shin-Etsu Chemical Co., Ltd., amine equivalents: 415), 63 mmol of trimellitic anhydride and 134 g of the aprotic polar solvent N-methyl-2-pyrrolidone, and the reaction mixture was heated to 80° C. and stirred for 30 minutes.

Upon completion of stirring, 100 mL of toluene was further added as an aromatic hydrocarbon capable of forming an azeotropic mixture with water, and then the reaction mixture was heated to 160° C. for 4 hours of reflux. Upon confirming accumulation of a stoichiometric amount of water in the water measuring receptacle with no further outflow of run-off of water, the water and toluene in the water measuring receptacle were removed. The reaction mixture was then heated to 180° C. to remove the toluene.

The solution in the flask was cooled to room temperature (25° C.). There were added thereto 30 mmol of the epoxy acrylate EA-1020 (trade name of Shin-Nakamura Chemical Co., Ltd., hydroxyl equivalents: 270) and 63 mmol of cis-4-cyclohexene-1,2-dicarboxylic anhydride, and the reaction mixture was heated to 100° C. for 2 hours of reaction. After again cooling the solution in the flask to room temperature (25° C.), 60 mmol of 4,4'-diphenylmethane diisocyanate was added and the reaction mixture was heated to 150° C. for 2 hours of reaction at that temperature. The reaction produced a polyamide resin with imide groups, obtained as a solution of the polyamide resin with imide groups in NMP.

Example 5

A 500 mL separable flask equipped with a Dean-Stark reflux condenser, thermometer and stirrer was prepared. There were added thereto 29 mmol of the diamine compound 2,2-bis[4-(4-aminophenoxy)phenyl]propane, 2 mmol of the siloxanediamine KF-8010 (trade name of Shin-Etsu Chemical Co., Ltd., amine equivalents: 415), 63 mmol of trimellitic anhydride and 134 g of the aprotic polar solvent N-methyl-2-pyrrolidone, and the reaction mixture was heated to 80° C. and stirred for 30 minutes.

Upon completion of stirring, 100 mL of toluene was further added as an aromatic hydrocarbon capable of forming an azeotropic mixture with water, and then the reaction mixture was heated to 160° C. for 4 hours of reflux. Upon confirming accumulation of a stoichiometric amount of water in the water measuring receptacle with no further outflow of run-off of water, the water and toluene in the water measuring receptacle were removed. The reaction mixture was then heated to 180° C. to remove the toluene.

The solution in the flask was cooled to room temperature (25° C.). There were then added thereto 30 mmol of the epoxy acrylate EA-1020 (trade name of Shin-Nakamura Chemical Co., Ltd., hydroxyl equivalents: 270) and 63 mmol of cis-4-cyclohexene-1,2-dicarboxylic anhydride, and the reaction mixture was heated to 100° C. for 2 hours of reaction at that temperature. After again cooling the solution in the flask to room temperature (25° C.), 63 mmol of 4,4'-diphenylmethane diisocyanate was added and the reaction mixture was heated to 150° C. for 2 hours of reaction at that temperature. The reaction produced a polyamide resin with imide groups, obtained as a solution of the polyamide resin with imide groups in NMP.

Comparative Example 1

A 300 mL separable flask equipped with a Dean-Stark reflux condenser, thermometer and stirrer was prepared. There were added thereto 37 mmol of the epoxy acrylate EA-1020 (trade name of Shin-Nakamura Chemical Co., Ltd., hydroxyl equivalents: 270) and 85 g of the aprotic polar solvent N-methyl-2-pyrrolidone. Next, 37 mmol of 4,4'-diphenylmethane diisocyanate was added at room temperature (25° C.), causing immediate gelling.

Comparative Example 2

A 300 mL separable flask equipped with a Dean-Stark reflux condenser, thermometer and stirrer was prepared. There were added thereto 37 mmol of the epoxy acrylate EA-1020 (trade name of Shin-Nakamura Chemical Co., Ltd., hydroxyl equivalents: 270), 39 mmol of cis-4-cyclohexene-1,2-dicarboxylic anhydride and 76 g of the aprotic polar solvent N-methyl-2-pyrrolidone, and the reaction mixture was heated to 100° C. and stirred for 2 hours.

The solution in the flask was cooled to room temperature (25° C.). After next adding 26 mmol of 4,4'-diphenylmethane diisocyanate, the reaction mixture was heated to 150° C. and reaction was conducted for 2 hours at that temperature, resulting in gelling.

Comparative Example 3

A 1000 mL separable flask equipped with a Dean-Stark reflux condenser, thermometer and stirrer was prepared. There were added thereto 142.5 mmol of the diamine compound 2,2-bis[4-(4-aminophenoxy)phenyl]propane, 7.5 mmol of the siloxanediamine KF-8010 (trade name of Shin-Etsu Chemical Co., Ltd., amine equivalents: 415), 315 mmol of trimellitic anhydride and 346 g of the aprotic polar solvent N-methyl-2-pyrrolidone, and the reaction mixture was heated to 80° C. and stirred for 30 minutes.

Upon completion of stirring, 200 mL of toluene was further added as an aromatic hydrocarbon capable of forming an azeotropic mixture with water, and then the reaction mixture was heated to 160° C. for 4 hours of reflux. Upon confirming accumulation of a stoichiometric amount of water in the water measuring receptacle with no further outflow of run-off of water, the water and toluene in the water measuring receptacle were removed. The reaction mixture was then heated to 180° C. to remove the toluene.

The solution in the flask was cooled to room temperature (25° C.). After next adding 150.8 mmol of 4,4'-diphenylmethane diisocyanate, the reaction mixture was heated to 150° C. and reaction was conducted for 2 hours at that temperature. The reaction produced a polyamide resin with imide groups and with no reactive double bonds, as an NMP solution containing a polyamide resin with imide groups and with no reactive double bonds.

Evaluation of Polyamide Resins

Table 1 below shows the weight-average molecular weights Mw (based on styrene) and degrees of acid modification of the polyamide resins of Examples 1 to 5 and Comparative Examples 1 to 3. The degrees of acid-modification shown in the table represent the proportion (%) of carboxylic anhydride added with respect to functional groups that produce carboxyl groups by reaction with carboxylic anhydride groups.

TABLE 1

|  | Acid modification | Mw |
| --- | --- | --- |
| Example 1 | 100% | 3400 |
| Example 2 | 100% | 13000 |
| Example 3 | 100% | 17000 |
| Example 4 | 100% | 29000 |
| Example 5 | 100% | 42000 |
| Comp. Example 1 | 0% | gelling |
| Comp. Example 2 | 50% | gelling |
| Comp. Example 3 | 0% | 30300 |

Preparation of Curable Resin Composition

Example 6

To the NMP solution of the polyamide resin obtained in Example 1 there was added α,α'-di(t-butylperoxy)diisopropylbenzene (PERBUTYL P by NOF Corp.) as a curing accelerator, to 1 wt % of the total solid content. It was then diluted to an appropriate viscosity with N,N-dimethylacetamide to obtain a solution of the curable resin composition.

Example 7

To the NMP solution of the polyamide resin obtained in Example 2 there was added α,α'-di(t-butylperoxy)diisopropylbenzene (PERBUTYL P by NOF Corp.) as a curing accelerator, to 1 wt % of the total solid content. It was then diluted to an appropriate viscosity with N,N-dimethylacetamide to obtain a solution of the curable resin composition.

Example 8

To the NMP solution of the polyamide resin obtained in Example 5 there was added α,α'-di(t-butylperoxy)diisopropylbenzene (PERBUTYL P by NOF Corp.) as a curing accelerator, to 1 wt % of the total solid content. It was then diluted to an appropriate viscosity with N,N-dimethylacetamide to obtain a solution of the curable resin composition.

Comparative Example 4

To the NMP solution of the polyamide resin obtained in Comparative Example 3 there was added α,α'-di(t-butylperoxy)diisopropylbenzene (PERBUTYL P by NOF Corp.) as a curing accelerator, to 1 wt % of the total solid content. It was then diluted to an appropriate viscosity with N,N-dimethylacetamide to obtain a solution of the curable resin composition.

Fabrication of Resin Films

A solution of each of the curable resin compositions prepared in Examples 6 to 8 and Comparative Example 4 was evenly coated onto a PET film and dried at 100° C. for 15 minutes. The dried film was then released from the PET film to obtain an uncured resin film comprising the curable resin composition.

DSC Measurement

A resin film (10 mg) fabricated from each of Examples 6 to 8 and Comparative Example 4 was measured for calorific value and heat release temperature in a temperature range of 50 to 350° C. (10° C./min increase). A differential scanning calorimeter (DSC: PYRIS1 DSC by PerkinElmer) was used for the measurement. The results are shown in Table 2. The calorific value was obtained by subtracting the blank value for the curing accelerator alone, and the temperature was the temperature at which the maximum calorific value was exhibited.

Dynamic Viscoelasticity Measurement

Each of the resin films fabricated in Examples 6 to 8 and Comparative Example 4 were further heated at 200° C. for 1 hour for curing. The glass transition temperature (Tg) of each of the resin films was determined as the maximum value for tan δ in a temperature range of 50 to 350° C., by the tension method with a temperature-elevating rate of 5° C./min, a chuck distance of 20 mm, a frequency of 10 Hz, an amplitude of 5 μm and an automatic dead weight. A dynamic viscoelasticity measuring apparatus (DVE: E-4000 dynamic viscoelasticity measuring apparatus by UBM) was used for the measurement. The results are shown in Table 2.

TABLE 2

|  | Calorific value (J/g) | Temperature (° C.) | Tg (° C.) |
| --- | --- | --- | --- |
| Example 6 | 77.2 | 145 | 170 |
| Example 7 | 47.8 | 159 | 210 |
| Example 8 | 45.3 | 160 | 215 |
| Comp. Example 4 | No distinct peak |  | 230 |

As shown in Table 2, the resin films of Examples 6 to 8 exhibited distinct exothermic peaks at 120 to 200° C. This indicates that curing was efficiently promoted by polymerization of the reactive double bonds. However, the resin film of Comparative Example 4 did not exhibit a distinct peak in the measurement range. The resin films of Examples 6 to 8 also exhibited Tg values that were sufficiently high to withstand use.

As demonstrated above, the process for production of a polyamide resin with reactive double bonds according to the invention can provide a curable resin composition that exhibits excellent film formability, that efficiently cures even at low temperature and that has sufficiently high heat resistance after curing.

Synthesis of Polyamideimide Resins

Example 9

A 1000 mL separable flask equipped with a Dean-Stark reflux condenser, thermometer and stirrer was prepared.

There were added thereto 79.8 mmol of the diamine compound 2,2-bis[4-(4-aminophenoxy)phenyl]propane, 4.2 mmol of the siloxanediamine KF-8010 (trade name of Shin-Etsu Chemical Co., Ltd., amine equivalents: 415), 176.4 mmol of trimellitic anhydride and 348.8 g of the aprotic polar solvent N-methyl-2-pyrrolidone (hereinafter abbreviated as NMP), to prepare a reaction mixture. The reaction mixture was then heated to 80° C. and stirred for 30 minutes at that temperature.

Upon completion of stirring, 200 mL of toluene was further added to the reaction mixture as an aromatic hydrocarbon capable of forming an azeotropic mixture with water. The reaction mixture was subsequently heated to 160° C. and refluxed for 4 hours at that temperature. Upon confirming accumulation of a stoichiometric amount of water in the water measuring receptacle with no further outflow of run-off of water, the water and toluene in the water measuring receptacle were removed. The reaction mixture was then heated to 180° C. to remove the toluene. This produced a solution containing diimidedicarboxylic acid.

The obtained solution was then cooled to room temperature (25° C., same hereunder). There were added thereto 84 mmol of the epoxy acrylate EA-1020 (trade name of Shin-Nakamura Chemical Co., Ltd.) and 176.4 mmol of cis-4-cyclohexene-1,2-dicarboxylic anhydride to prepare a reaction mixture. The reaction mixture was subsequently heated to 100° C. and stirred for 2 hours at that temperature. This reaction produced a reactive double bond-containing carboxylic acid, as a solution containing a diimidedicarboxylic acid and the reactive double bond-containing carboxylic acid.

The solution was cooled to room temperature, and then 117 mmol of 4,4'-diphenylmethane diisocyanate was added to prepare a reaction mixture. The reaction mixture was subsequently heated to 150° C. and reaction was conducted for 2 hours at that temperature. The reaction produced a polyamideimide resin, obtained as a solution of the polyamideimide resin in NMP.

Example 10

A 500 mL separable flask equipped with a Dean-Stark reflux condenser, thermometer and stirrer was prepared. There were added thereto 28.5 mmol of the diamine compound 2,2-bis[4-(4-aminophenoxy)phenyl]propane, 1.5 mmol of the siloxanediamine KF-8010 (trade name of Shin-Etsu Chemical Co., Ltd., amine equivalents: 415), 78.8 mmol of cyclohexanetricarboxylic anhydride and 139.1 g of the aprotic polar solvent NMP, to prepare a reaction mixture. The reaction mixture was then heated to 80° C. and stirred for 30 minutes at that temperature.

Upon completion of stirring, 100 mL of toluene was further added as an aromatic hydrocarbon capable of forming an azeotropic mixture with water, and then the reaction mixture was heated to 160° C. for 4 hours of reflux. Upon confirming accumulation of a stoichiometric amount of water in the water measuring receptacle with no further outflow of run-off of water, the water and toluene in the water measuring receptacle were removed. The reaction mixture was then heated to 180° C. to remove the toluene. This produced a solution containing diimidedicarboxylic acid.

The obtained solution was then cooled to room temperature. There were added thereto 30.0 mmol of the epoxy acrylate EA-1020 (trade name of Shin-Nakamura Chemical Co., Ltd.) and 63.0 mmol of cis-4-cyclohexene-1,2-dicarboxylic anhydride to prepare a reaction mixture. The reaction mixture was subsequently heated to 100° C. and stirred for 2 hours at that temperature. This reaction produced a reactive double bond-containing carboxylic acid, as a solution containing a diimidedicarboxylic acid and the reactive double bond-containing carboxylic acid.

The solution was cooled to room temperature, and then 69.0 mmol of 4,4'-diphenylmethane diisocyanate was added to prepare a reaction mixture. The reaction mixture was subsequently heated to 150° C. and reaction was conducted for 2 hours at that temperature. The reaction produced a polyamideimide resin, obtained as a solution of the polyamideimide resin in NMP.

Example 11

A 500 mL separable flask equipped with a Dean-Stark reflux condenser, thermometer and stirrer was prepared. There were added thereto 42.8 mmol of the diamine compound 2,2-bis[4-(4-aminophenoxy)phenyl]propane, 2.3 mmol of the siloxanediamine KF-8010 (trade name of Shin-Etsu Chemical Co., Ltd., amine equivalents: 415), 94.5 mmol of trimellitic anhydride and 191.4 g of the aprotic polar solvent NMP, to prepare a reaction mixture. The reaction mixture was then heated to 80° C. and stirred for 30 minutes at that temperature.

Upon completion of stirring, 100 mL of toluene was further added as an aromatic hydrocarbon capable of forming an azeotropic mixture with water, and then the reaction mixture was heated to 160° C. for 4 hours of reflux. Upon confirming accumulation of a stoichiometric amount of water in the water measuring receptacle with no further outflow of run-off of water, the water and toluene in the water measuring receptacle were removed. The reaction mixture was then heated to 180° C. to remove the toluene. This produced a solution containing diimidedicarboxylic acid.

The obtained solution was then cooled to room temperature. There were added thereto 45 mmol of the epoxy acrylate EA-1020 (trade name of Shin-Nakamura Chemical Co., Ltd.) and 94.5 mmol of cis-4-cyclohexene-1,2-dicarboxylic anhydride. The reaction mixture was subsequently heated to 100° C. and stirred for 2 hours at that temperature. This reaction produced a reactive double bond-containing carboxylic acid, as a solution containing a diimidedicarboxylic acid and the reactive double bond-containing carboxylic acid.

The solution was cooled to room temperature, and then 72.0 mmol of 4,4'-diphenylmethane diisocyanate was added to prepare a reaction mixture. The reaction mixture was subsequently heated to 150° C. and reaction was conducted for 2 hours at that temperature. The reaction produced a polyamideimide resin, obtained as a solution of the polyamideimide resin in NMP.

Comparative Example 5

A 1000 mL separable flask equipped with a Dean-Stark reflux condenser, thermometer and stirrer was prepared. There were added thereto 142.5 mmol of the diamine compound bis(3-hydroxyl-4-aminophenyl), 7.5 mmol of the siloxanediamine X-22-161-B (trade name of Shin-Etsu Chemical Co., Ltd., amine equivalents: 1600), 315 mmol of trimellitic anhydride and 346 g of the aprotic polar solvent NMP, to prepare a reaction mixture. The reaction mixture was then heated to 80° C. and stirred for 30 minutes at that temperature.

Upon completion of stirring, 200 mL of toluene was further added as an aromatic hydrocarbon capable of forming an azeotropic mixture with water, and then the reaction mixture was heated to 160° C. for 4 hours of reflux. Upon confirming accumulation of a stoichiometric amount of water in the water measuring receptacle with no further outflow of run-off of water, the water and toluene in the water measuring receptacle were removed. The reaction mixture was then heated to 180° C. to remove the toluene. This produced a solution containing diimidedicarboxylic acid.

The solution was then cooled to room temperature, and 150.8 mmol of 4,4'-diphenylmethane diisocyanate was added. The reaction mixture was subsequently heated to 150° C. and reaction was conducted for 2 hours at that temperature. The reaction produced a polyamideimide resin, obtained as a solution of the polyamideimide resin in NMP.

Evaluation of Polyamideimide Resins

The polyamideimide resins obtained in Examples 9 to 11 and Comparative Example 5 were used for measurement of the weight-average molecular weight Mw (in terms of styrene) and evaluation of the degree of carboxylic acid modification. Table 3 shows the measurement and evaluation results. The degrees of carboxylic acid-modification shown in the table represent the proportions of carboxylic anhydride added with respect to functional groups that produce carboxyl groups by reaction with carboxylic anhydride groups.

TABLE 3

| | Carboxylic acid modification | Mw |
|---|---|---|
| Example 9 | 100% | 13,000 |
| Example 10 | 100% | 41,000 |
| Example 11 | 100% | 17,000 |
| Comp. Example 5 | 0% | 30,300 |

As shown in Table 3, the polyamideimide resins obtained in Examples 9 to 11 had sufficiently high weight-average molecular weights.

Preparation of Curable Resin Compositions

Example 12

To the NMP solution of the polyamideimide resin obtained in Example 9 there was added α,α'-di(t-butylperoxy)diisopropylbenzene (PERBUTYL P by NOF Corp.) as a curing accelerator, to 1 wt % of the total solid content, to obtain a solution of the curable resin composition.

Example 13

To the NMP solution of the polyamideimide resin obtained in Example 10 there was added α,α'-di(t-butylperoxy)diisopropylbenzene (PERBUTYL P by NOF Corp.) as a curing accelerator, to 1 wt % of the total solid content, to obtain a solution of the curable resin composition.

Example 14

To the NMP solution of the polyamideimide resin obtained in Example 11 there was added α,α'-di(t-butylperoxy)diisopropylbenzene (PERBUTYL P by NOF Corp.) as a curing accelerator, to 1 wt % of the total solid content, to obtain a solution of the curable resin composition.

Comparative Example 6

To the NMP solution of the polyamideimide resin obtained in Comparative Example 5 there was added α,α'-di(t-butylperoxy)diisopropylbenzene (PERBUTYL P by NOF Corp.) as a curing accelerator, to 1 wt % of the total solid content, to obtain a solution of the curable resin composition.

Fabrication of Resin Films

A solution of each of the curable resin compositions prepared in Examples 12 to 14 and Comparative Example 6 was evenly coated onto a PET film and dried at 100° C. for 15 minutes. The dried film was then released from the PET film to obtain an uncured resin film comprising the curable resin composition.

DSC Measurement

A resin film (10 mg) fabricated from each of Examples 12 to 14 and Comparative Example 6 was measured for calorific value and heat release temperature in a temperature range of 50 to 350° C. (10° C./min increase). A differential scanning calorimeter (DSC: PYRIS1 DSC by PerkinElmer) was used for the measurement. Table 4 shows the measurement results. The calorific values shown in the table were obtained by subtracting the blank value for the curing accelerator alone, and the temperatures are the temperatures at which the maximum heat values were exhibited.

TABLE 4

| | Calorific value (J/g) | Heat release temperature (° C.) |
|---|---|---|
| Example 12 | 47.8 | 159 |
| Example 13 | 56.4 | 155 |
| Example 14 | 48.3 | 157 |
| Comp. Example 6 | No distinct peak | |

As shown in Table 4, the resin films of Examples 12 to 14 exhibited distinct exothermic peaks at 120 to 200° C. This indicates that curing was efficiently promoted by polymerization of the reactive double bonds. However, the resin film of Comparative Example 6 did not exhibit a distinct peak in the measurement range.

As demonstrated above, the invention can provide high molecular weight polyamideimide resins that have reactive double bonds on side chains. Such polyamideimide resins according to the invention can provide curable resin compositions that exhibit excellent film formability, that efficiently cure even at low temperature and that have sufficiently high heat resistance after curing.

The invention claimed is:

1. A process for production of a polyamide resin having a reactive double bond,
the process comprising a step of reacting a carboxylic acid and a diisocyanate to produce a polyamide resin, and
the carboxylic acid component including a carboxylic acid with a reactive double bond represented by the following formula (1):

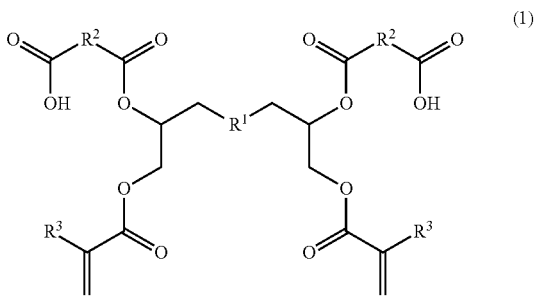

wherein $R^1$ and $R^2$ each independently represent divalent organic groups and $R^3$ represents a hydrogen atom or a methyl group.

2. A process for production of a polyamide resin according to claim 1,
wherein the carboxylic acid with a reactive double bond is a carboxylic acid obtainable by reacting a carboxylic anhydride with a (meth)acrylate compound having a functional group that reacts with a carboxylic anhydride group to produce carboxyl groups, and having an acrylate or methacrylate group.

3. A process for production of a polyamide resin according to claim 2,
wherein the average number of functional groups in each molecule of the (meth)acrylate compound is no greater than 2.5.

4. A process for production of a polyamide resin according to claim 2,
wherein the functional group is a hydroxyl group.

5. A curable resin composition containing a polyamide resin obtainable by a process for production of a polyamide resin according to claim 1.

6. A curable resin composition according to claim 5, which cures by heat or light.

7. A process for production of a polyamide resin according to claim 1, wherein $R^1$ is a group derived from an epoxy compound, and $R^2$ is a group derived from a dicarboxylic anhydride.

* * * * *